United States Patent
Fuhrmann et al.

(10) Patent No.: US 8,432,814 B2
(45) Date of Patent: Apr. 30, 2013

(54) NODE OF A DISTRIBUTED COMMUNICATION SYSTEM, NODE AND MONITORING DEVICE COUPLED TO SUCH COMMUNICATION SYSTEM

(75) Inventors: Peter Fuhrmann, Aachen (DE); Markus Baumeister, Munich (DE)

(73) Assignee: NXP B.V., Eindhoven (NL)

( * ) Notice: Subject to any disclaimer, the term of this patent is extended or adjusted under 35 U.S.C. 154(b) by 499 days.

(21) Appl. No.: 12/530,259

(22) PCT Filed: Mar. 3, 2008

(86) PCT No.: PCT/IB2008/050760
§ 371 (c)(1), (2), (4) Date: Sep. 8, 2009

(87) PCT Pub. No.: WO2008/110957
PCT Pub. Date: Sep. 18, 2008

(65) Prior Publication Data
US 2010/0014439 A1   Jan. 21, 2010

(30) Foreign Application Priority Data
Mar. 14, 2007 (EP) .................................... 07005264

(51) Int. Cl.
*G01R 31/08* (2006.01)

(52) U.S. Cl.
USPC .......................................................... 370/242

(58) Field of Classification Search .................. None
See application file for complete search history.

(56) References Cited

U.S. PATENT DOCUMENTS

| 5,708,776 | A | 1/1998 | Kikinis |
|---|---|---|---|
| 7,583,692 | B2 | 9/2009 | Fuhrmann et al. |
| 7,616,619 | B2 | 11/2009 | Budde et al. |
| 2004/0078731 | A1 | 4/2004 | Becher et al. |
| 2004/0083310 | A1 | 4/2004 | Hetzel et al. |
| 2010/0211258 | A1* | 8/2010 | Sakurai et al. .................. 701/31 |

FOREIGN PATENT DOCUMENTS

| CN | 1417983 A | 5/2003 |
|---|---|---|
| CN | 1459173 A | 11/2003 |
| EP | 1662714 A1 | 5/2006 |
| JP | 04056540 A | 2/1992 |
| WO | 2006067673 A | 6/2006 |

* cited by examiner

*Primary Examiner* — Kevin C Harper

(57) ABSTRACT

The present invention relates to a node in distributed communication system operating under a time triggered protocol, further it relates to distributed communication system and to a monitoring device coupled to such node of a communication system. To provide a node in a distributed communication system, a distributed communication system and a monitoring device increasing the error detection and reducing complexity for providing a high availability for systems which require a non 100% fail safe solution a node is proposed comprising: a communication controller (15) coupled to a receiving and a transmission path, a host (13) for performing an application, and a monitoring device (16) coupled at least to one of a transmission path of the communication controller (15), an interface (91) between communication controller (15) and the host (13), and to internal lines of the communication controller (15), wherein the monitoring device (16) is provided for evaluating information provided by the communication controller (15) to monitor at least one state of the communication controller (15), wherein in case of detecting a non-defined state the host (13) is informed for performing predetermined actions in respect to the state of the communication controller (15). Thereby, an easy cost reduced solution is provided adapted to detect a predetermined number of faults in a distributed communication system.

9 Claims, 8 Drawing Sheets

NODE OF A DISTRIBUTED COMMUNICATION SYSTEM, NODE AND MONITORING DEVICE COUPLED TO SUCH COMMUNICATION SYSTEM

FIELD OF THE INVENTION

The present invention relates to a node of a distributed communication system, further it relates to a distributed communication system and to a monitoring device coupled to such node of a communication system.

BACKGROUND OF THE INVENTION

There are some protocols used in distributed communication systems. In the automotive area especially time-triggered protocols are used. One of such protocols is the FlexRay protocol. The FlexRay communication protocol is the answer of the automotive industry to the increasing demands for reliable, high-speed data communication in the automotive area, or similar applications. The FlexRay communication protocol is based on a TDMA scheme to coordinate access of participating devices to the communication system. But it avoids to employ a master synchronizing node within the automotive communication system to achieve a decentralized more fault robust bus architecture. This requires a mutual synchronization of all participating nodes within the communication system when starting the communication system to achieve an agreement on a global time base.

The FlexRay communication protocol provides a mechanism for such start-up phase by using start-up and sync frames. Further, the FlexRay protocol allows to transmit symbols for avoiding collisions. Normally, data are transmitted by use of frames which are aligned within slots, wherein each frame includes a header and data part.

During operating such communication system based on a FlexRay communication protocol it has been recognized that during the start phase especially failures of a single node may appear, wherein such failure could either prevent start-up of the node, which is lowering the availability or will lead to a clique formation influencing the whole communication system causing a logical network partitioning. The FlexRay communication protocol is a so-called two-channel transmission system. When outputting different or differently timed synchronization frames on both output channels of a node, it may possible to establish a group of nodes, which are synchronized to each other, but not to other groups of nodes. Thus, another group within the communication system may use a different time base, since it is based on the timely displaced sync frames. Such formation of cliques within the communication system may result to either reduce the availability or reliability of the communication system, if it is undetected.

Other failures during synchronization during the start-up phase or also general failures during the transmitting of data could be caused by transient or permanent hardware faults like stuck bits, or flipped bits, timing errors or spurious resets.

Within the FlexRay protocol, each node has assigned certain slots for transmitting its data. During that time, no further nodes shall communicate. Therefore, it is highly required that all nodes accept the slot structure and the general scheduling plan of the communication system, which is based on the global time base, defined during the start-up of the communication system.

Currently there are two solutions for preventing failures of a single node, which may result in a failure of the complete communication system. There are several architectures using a so-called bus guardian, which is added in parallel to each communication controller of a node and which observes the access of the communication controller to the medium and prevents a node from accessing the medium, if it is not allowed for the specific node to access the medium since another node is allowed to transmit during a certain time slot. Such bus guardian has to form its own opinion on the state of its node and on the state the medium should have. Therefore, the bus guardian has basically the same complexity as the communication controller of a node. The bus guardian receives the same commands from the host as the communication controller. Thus, it may not detect faults of the host. Further, to detect whether a node transmits in an illegal slot the bus guardian only roughly checks the timing of frames on the transmitting path and not their content. Thus errors such as small timing differences or wrong frame contents due to a broken counter in the communication controller are not directly detectable by the bus guardian.

A second mechanism is possible which is executed solely by a host (CPU) of the node that may check the data passed from the communication controller to the host. The host is monitoring inconsistencies indicating a possible failure of the controller.

However, both solutions have shortcomings. As already indicated the bus guardian doubles the complexity of the controller. However, it protects the network against nearly all possible failures in various states, not specifically only during start-up. The second solution in which the host detects failures based on information provided by the communication controller, suffers from the fact that it has to rely on the information provided by the communication controller. Thus, the second solution may suffice for many simple errors, but more complex errors of a communication controller could fake this information or simply repeat the correct information from the previous time. Thus, the host may decide based on corrupt information, which is resulting in a non-correctly operating of the communication controller, which may result in a failure of the complete network.

Therefore, a solution is needed which may provide an increased error detection and which is avoiding the possibility to base the error detection and mitigation on only information provided by the communication controller and having a complexity significantly below the bus guardian.

OBJECT AND SUMMARY OF THE INVENTION

Therefore, it is an object of the present invention to provide a node of a distributed communication system, a distributed communication system and a monitoring device increasing the error detection and reducing complexity for providing a high availability for systems which require a non 100% fail safe solution.

The object is solved by features of the independent claims.

The invention bases on the thought to provide a small hardware component, hereinafter called monitoring device, which may be considered as a side-checker, which is advantageously provided on the same silicone chip as the communication controller and which will analyze the behavior of the communication controller by monitoring one of the input and output lines of the communication controller, the internal states of the communication controller and/or information provided by the communication controller to the host. If the monitoring device recognizes a non-defined behavior of the communication controller which has the possibility to disrupt the communication of other nodes, the monitoring device will signal the erroneous or defective behavior of the communication controller to the host. The host is then responsible to perform the required actions, for instance to shut down the communication controller or to prevent further transmissions of the communication controller in other ways. Thereby, an easy cost reduced solution is provided adapted to detect a predetermined number of faults in a distributed communication system.

In particular, the monitoring device employs a mix of counters, timers and analyzing logic to verify the correctness of important processes within the communication controller. By using the inventive architecture and in particular the monitoring device the complexity for determining the medium state and the node state is reduced since the monitoring device uses pre-processed information of the communication controller. Further, it uses the inputted and outputted information of the communication controller to decide whether the behavior is correct or not.

Moreover, by adjusting the amount of information, provided by the communication controller to observe, different levels of fault protection may be achieved.

In particular, the placing of the monitoring device for error detection next to the supervised communication controller allows to use internal lines, e.g. debug lines and to observe internal states of the supervised communication controller to get a clearer picture of the situation.

The monitoring device represents a dedicated hardware which prevents the host from becoming overloaded with periodic and additional tasks for error detection. Thus, the error mitigation may be dedicated to the monitoring device allowing the host to perform more complex strategies to be executed. Since the monitoring device only provides information that the communication controller operates faulty, the host may decide to shut down the controller, to reset the controller, to configure the controller, for instance, only for one of the output/input channels, or to configure the controller to operate in a non-synchronized manner to allow only receiving operation.

In a preferred embodiment of the invention, the monitoring device may use various information available from the communication controller for its supervision. The more preprocessed information are used within the monitoring device the less complex the monitoring device becomes, but at the same time it will also become more susceptible to Byzantine errors of the communication controller. The complexity of the monitoring device depends on how many and which errors should be detected by the monitoring device.

The complexity costs of the following configuration have to be weighted therefore, against the needed fault protection to be achieved.

A first kind of errors which may be detected by the monitoring device are errors caused by the hosts which could prevent cluster-wide startup. The generation of faulty commands by the host causes that the node cannot be integrated during the startup procedure. Moreover, an erroneously operating host may block any other nodes from coldstarting due to the continuously outputting commands (e.g. READY). Thus, the node will never run out of coldstart attempts. A reason for such behavior may be a clock of the host, which is running too fast. The monitoring device is therefore checking number of READY commands within a predetermined time, wherein it may be possible to overcome this problem by enforcing a minimum delay between READY and RUN commands. For avoiding such faults, the monitoring device monitors the host commands provided to the communication controller. In particular, the monitoring device counts the READY commands received from the host and checks the READY commands per time or the time between the READY commands versus a predetermined threshold. If a certain threshold is violated or exceeded, there is a high probability that the host is buggy and is operating in a defective manner. The host behavior could cause the node to inhibit all other nodes of the network from start-up in the following way: The communication controller would try to start up the network after a RUN command by the host but abort its startup due to the following READY (approximately=reset) command of the host. This would result in a total abort of startup of the whole network. If this RUN-READY sequence was repeated quickly enough the communication controller would always claim the medium as first node of the network but then abort startup. Thus the network could not start up due to one faulty host.

For the supervision of the host commands, it might be necessary or beneficial to report a detected fault also to an outside control unit or to a control instance, since this monitoring device has detected in such case that the host is probably erroneously operating and could therefore also react erroneously to an error report. Alternatively, the monitoring device by itself may take actions to drive the supervised communication controller in a safe state, i.e. in a fail silent mode.

A further possibility which may be provided by the monitoring device is the supervision of internal states of the communication controller to detect failures which could lead to clique formation. For this the monitoring device maintains its own state variable representing the state of the communication controller should be in and changes it based on events sent by the controller (e.g. integration_successful) and commands sent by the host (e.g. WAKEUP or RUN). It uses this internal state to control that the state changes executed by the communication controller are consistent in their own (e.g. no direct transition from READY state to NORMAL_ACTIVE state) as well with the state maintained by the monitoring device (e.g. no transition from INITIALIZE_SCHEDULE to INTEGRATION_COLDSTART_CHECK without a previous integration_successful event from the communication controller). This allows to detect errors in the state machine which could cause the communication controller to erroneously circumvent the safeguards proscribed by the protocol definition.

Another possibility exists to detect failures which could cause clique formation. The monitoring device maintains its own cycle and slot value and increases them based on events (e.g. cycle start) provided by the communication controller. It also uses an own state variable as described above. It checks the values of these counters against the values indicated by the communication controller via debug lines. Since the communication controller is only allowed in predetermined states to reset one of these counters, it is easily possible by the monitoring device to detect defective operation of the communication controller, if the counters indicated by the communication controller diverge from the counters maintained by the monitoring device in a state in which no reset is allowed. In such a case the monitoring device will signal a defective operation to the host. This procedure protects against several stuck-bits/flipped-bits errors. Although for ultimate protection, the monitoring device needs to decode the frames sent on the transmitting channels of the communication controller and to check for correct cycle/slot ID used because bits could be stuck/flipped also in the transmission pipeline of the communication controller. If in the latter variation the slot or cycle ID transmitted does not fit the respective counter maintained by the monitoring device, an error is signaled.

In a further embodiment of the present invention it is possible to detect a so-called babbling symbol transmission of the communication node. As already mentioned above, in the FlexRay communication protocol it is possible to transmit frames comprising a header and a data part. Additionally, a FlexRay communication protocol allows to transmit special symbols. There is a collision avoiding symbol (CAS) and the wake-up symbol (WUS). If such symbols are transmitted on the bus, all other nodes will recognize these symbols and will stop their own attempt to wake up or start up the network. Also such a symbol will collide with frames send by other nodes and destroy them. Thus, it is easily possible that in case of an erroneous communication controller, it will send permanently such a CAS symbol, which may inhibit proper transmission of all other nodes. The assigned monitoring device may in this case observe the transmission channels of the communication controller as well as its own internal state (as indicated two possible embodiments above). Long phases of low transmission signify a transmission of a CAS/WUS. The number of transmitted symbols is counted. If—based on the state the communication controller is in—more than a certain number of such symbols is transmitted an error is signaled to the host. This will prevent the communication controller from inhibiting other nodes to start-up due to repeated symbol reception resetting their waiting protocol. In case of the babbling CAS/WUS prevention the sensing of low transmission periods for certain duration will eliminate the need for a complex decoding circuit to be realized within the monitoring device since the detection of long low phases is significantly easier than actual frame decoding. In particular, if the monitoring device noticed that the communication controller is in a wake up state and more than a predetermined number (e.g. 63) of symbols are sent the host will be informed. Moreover, if the monitoring device noticed that the communication controller is not in a wake up state and more than one WAKEUP symbols is sent the host is informed.

In a further preferred embodiment of the invention the monitoring device is able to prevent the network from forming cliques caused by desynchronized sync frame transmission. Since the FlexRay communication protocol is a two-channel protocol, each host is required to transmit the sync frames, which are used by all nodes to achieve a global time base, on both channels at the same time. It is not sufficient to transmit sync frames within the same slot but the transmission of the sync frames on both channels actually has to start at the same time. The monitoring device may thus observe both transmission channels as well as the slot counter. If the communication controller starts transmitting in a slot of the static segment denoted as sync frame slot at different times on each channel, an error is indicated to the host. This prevents clique formation otherwise possible if other nodes on the network elected to synchronize on different channels.

In respect to the prevention of formation of cliques due to desynchronization between the two transmission channels, the monitoring of both transmission channels may be also realized without a decoding circuit for the monitoring device because it is enough to observe the start of transmission which might be indicated separately from the actual data to transmit (e.g. TxEn vs TxD in FlexRay).

Moreover, in a further preferred embodiment it is possible to verify a sync frame reception. For this monitoring device uses data received and pre-processed by the communication controller to decode the frame headers of the received information. Therefore, the monitoring device is connected with the communication controller to receive the preferably strobed bits after being received and converted within the communication controller. The number of sync frame headers which are decoded this way by the monitoring device during a cycle is counted. As some of the headers seen by the monitoring device might have belonged to frames invalid for synchronization, the number of sync frame headers determined by the monitoring device constitutes an upper limit for the numbers of sync frames which the communication controller may signal to the host. If the communication controller signals to the host that it has seen more sync frames, the monitoring device can notify the host of the erroneous operation. This prevents the communication controller of claiming to have seen enough sync frames and to change its mode to a mode which allows to transmit when the communication controller actually didn't see enough sync frames. That could lead to clique formation or to a network where only some nodes have started up.

The existence of a monitoring device also allows the cheap introduction of further checks for only locally relevant errors. In another embodiment of the invention, the monitoring device may additionally include a frame format checker, which will observe the transmission output channels of the communication controller and to check whether the correct and expected sequence of low/high and high/low signal changes occur which are indicative for a frame. With such frame format checker the monitoring device may easily collect information that reasonably confirms that an expected frame transmission actually occurred. The complex bit sequences are mapped to a simple pattern for parts of the communication elements transmitted on the transmitting channels, so that they can be easily compared within the monitoring device with low effort. If an expected frame transmission did not occur, the monitoring device signals the host which can then quickly try to resolve the issue (e.g. by repeating transmission in another slot) instead of e.g. having to wait for a negative acknowledgement message.

Further, the monitoring device may detect that a frame is sent in a wrong slot or cycle. As mentioned above the node is allowed only to transmit data at predetermined slots according to the schedule. For detecting such faults the monitoring device decodes the header of the frames transmitted by the communication controller using the TxD signal. The monitoring device checks whether slotID and cycleID coincide with the slot and cycle counter maintained by the monitoring device (see above). Further, a CRC-check of the header CRC is made in the monitoring device. A failure of the ID check or of the CRC check is a certain sign of a frame sent in the wrong slot. In both cases the host is informed. It is easy to see that this mechanism can be extended to replicate the complete checks performed at reception also during transmission to detect transmission errors caused by the protocol engine early.

Finally, it may happen that the protocol engine sends NULL frames even though data was passed to the communication controller. In such case the monitoring device will decode the null-frame bit in the frame header and the first payload word against the commands received from the host. In case of a mismatch the host is informed.

However the present invention may also be used for non time triggered protocols, like WLAN. In such case the monitoring device may check whether the node sends the correct content within the packets frames sent out by the communication controller by decoding and comparing the data provided from the host to the communication controller and the data sent out finally by the communication controller. Further, the invention is not limited to a wired medium or bus. It may be operated also based on wireless communication technology.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
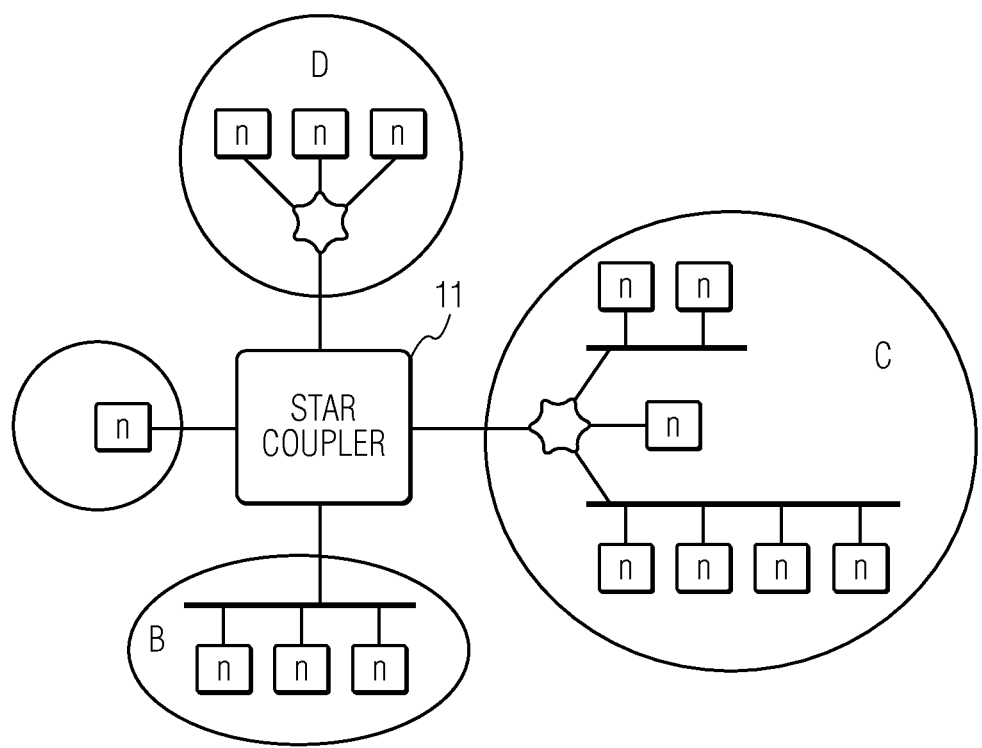
FIG. 1 shows an example for a distributed communication system.

FIG. 1 illustrates a communication system as used in the present invention. The communication system illustrated in FIG. 1 is divided into a number of sub-nets (A-D), each of them be supported by a passive bus or by a star-coupler.

Figure 2:
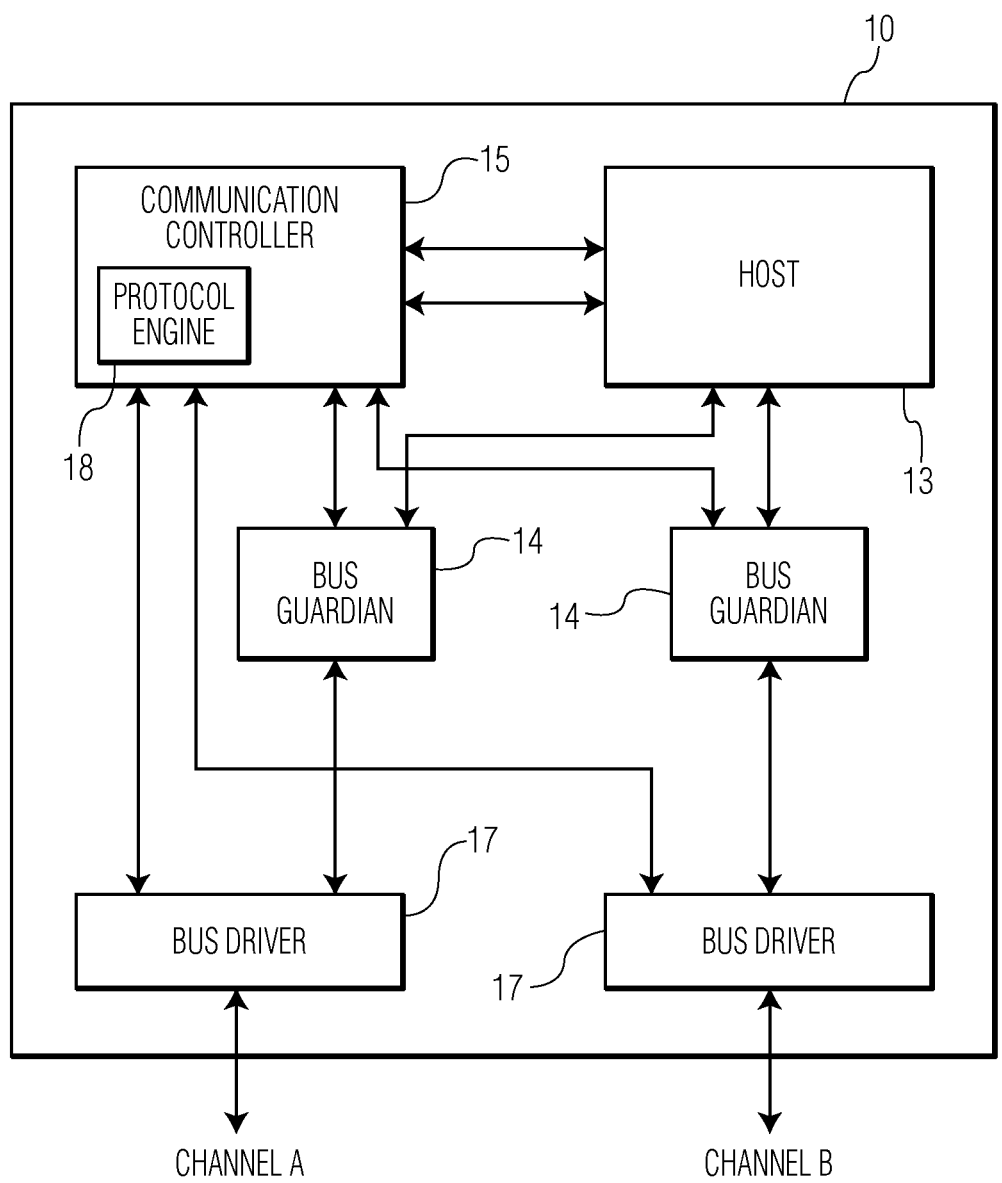
FIG. 2 illustrates a node having a bus guardian.

With reference to FIG. 2, a node 10 used in such sub-net is described in more detail. A typical fault-tolerant time-triggered network consists usually of two communication channels A, B, to which nodes 10 are connected. Each of those nodes 10 comprises a bus driver 17, a communication controller 15 and eventually a bus guardian device 14 for each bus driver and a host 13. The bus driver 17 transmits the bits and bytes that the communication controller 15 provides onto its connected channels and in turn provides the communication controller 15 with the information it receives from the channels A, B. The communication controller 15 is connected to both channels and delivers relevant data to the host 13 and receives data from the host 13. The communication controller 15, in turn, assembles data to frames and delivers the data to the bus driver 17. The number of channels is not relevant for the invention. The configuration of such two-channel node 10 is explained only for getting a better overview for the application. The invention is not limited or restricted by the presence or absence of parts within the described node. The communication controller 15 contains a so-called protocol engine 18, which provides a node 10 with the facilities for the layer-2 access protocol. Most relevant for this invention is the facility to access the medium with a pre-determined TDMA scheme or communication schedule. The communication schedule for each node 10 inside the communication system has to be configured such that no conflict between the nodes 10 occurs when transmitting data on the communication system. The bus guardian 14 is a device with an independent set of configuration data that enables the transmission on the bus only during those slots, which are specified by the communication schedule. The host 13 contains the data source and sink and is generally not concerned with the protocol activity. Only decisions that the communication controller 15 cannot do alone are made by the host 13.

Synchronization between the nodes 10 is a pre-requisite to enable a time-triggered TDMA based access to the network, as required for the FlexRay protocol. Usually each node 10 has its own clock, for which the time base can differ from the other nodes 10, although they are originally intended to be equal, caused by temperature and voltage fluctuations and production tolerance.

The communication controller 15 within each node 10 includes a synchronization mechanism, wherein nodes 10 listen to their attached channels and can adapt to the synchronization or influence a common clock rate and offset.

Network startup in the communication system is handled by so called cold-starting nodes, whereof one initiates the communication cycles and others respond. This node is selected either by configuration or by some algorithm, that determines which of several potential nodes performs the startup. This algorithm generally consists of transmitting frames or similar constructs over the attached channels, whenever no existing communication schedule could be detected. The communication controller 15 of a cold-starting node thereby has to listen to all attached channels and has to transmit its startup data including sync frames on all attached potentially redundant channels at the same time. If the communication controller 15 receives specific sync frames or similar constructs indicating a startup it will adopt the timing scheme from the observed communication and integrate into the system.

It could be easily seen from FIG. 2, the complexity of a node including a bus guardian is high.

Thus, it is required according to the present invention to provide a monitoring device 16, which is able to protect the communication system in case that the host 13 or a communication controller 15 is operating erroneously.

Figure 3A:
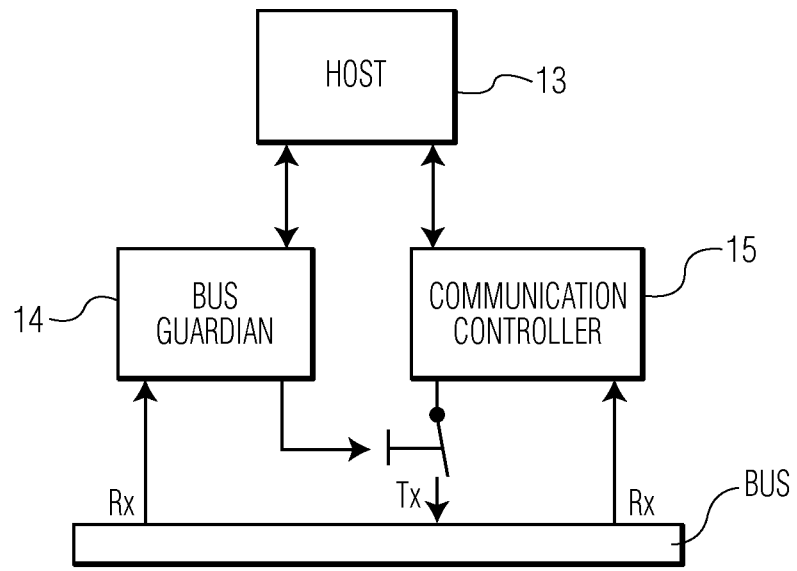
FIG. 3a illustrates a node using a host based error detection.
Figure 3B:
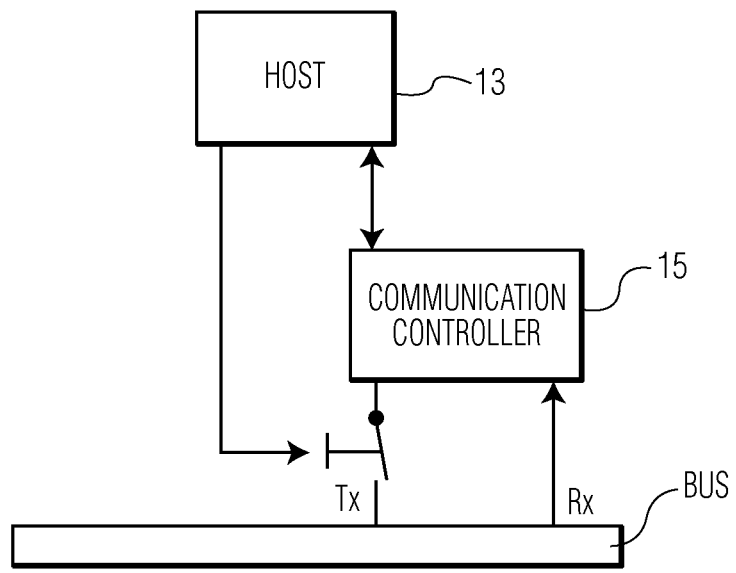
FIG. 3b illustrates a node using a bus guardian based error detection.

In FIGS. 3a and 3b, two conventional approaches for error mitigation in a node are illustrated.

In FIG. 3, a bus guardian solution is illustrated. Since the bus guardian 14 has nearly the same complexity than the communication controller 15, the bus guardian 14 itself is able to monitor based on the communication schedule whether the communication controller 15 is allowed to send in a certain time slot or not. Therefore the bus guardian is coupled directly to the communication system to recognize the state of the communication system. Further, the bus guardian 14 is able to disconnect the transmission path of the communication controller 14 in case of detecting any errors. However, the costs and the space required for a bus guardian 14 are high. Further, such 100% failsafe solution is not required for most applications.

In FIG. 3b, a software based solution for error mitigation is illustrated. The communication controller 15 is connected to the host 13, wherein the host 13 monitors information provided by the communication controller 15 to the host 13. Based on the received information, the host 13 may evaluate whether the communication controller 15 behaves correctly or not. In case of a non-correctly operating of the communication controller 15, the host 13 may disable the transmission operation of the communication controller 15 by disconnecting the transmitting path. However, the decision whether the communication controller 15 is operating correctly or not is based on information provided by the communication controller 15 itself. Thus, this information may be not correct and therefore also the decision whether to connect or disconnect the communication controller 15 is less reliable.

Figure 4:
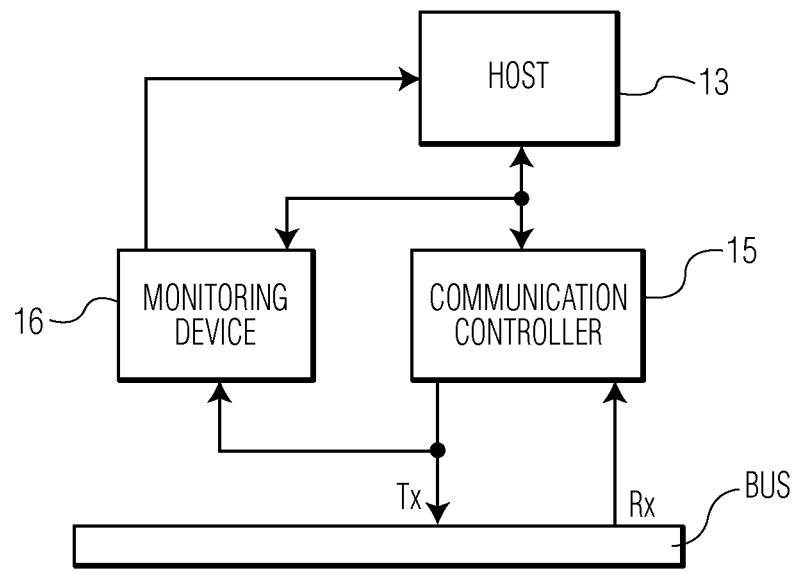
FIG. 4 illustrates a first inventive embodiment of a node.

Therefore, the present invention proposes to provide a monitoring device 16, which is illustrated in FIG. 4. The monitoring device 16 is coupled to the transmission path of the communication controller 15, directly to the communication controller 15 and connected to the information output for providing information to the host 13.

Thus, the monitoring device 16 is able to detect predetermined errors by checking counter, timers and states provided by preprocessed information of the communication controller or its input and output lines.

In case that the monitoring device 16 detects a behavior of the communication controller 15, which is not correct, this behavior is reported to the host 13. Thus, the host 13 may stop the communication controller 15 or may reset the communication controller 15. Alternatively or additionally a solution similar to the one in FIG. 3b is possible where the host disconnects the Tx path but this solution is based on information from the monitoring device instead based on information from the controller itself.

The monitoring device 16 may be realized on the same silicon chip as the communication controller 15, but it does not need to be placed there. Since the number of the components is limited the monitoring device 16 maybe easily realized together with the communication controller 15. Thus the connection lines for monitoring the states are very short avoiding further faults due to connection or transmission problems.

Figure 5:
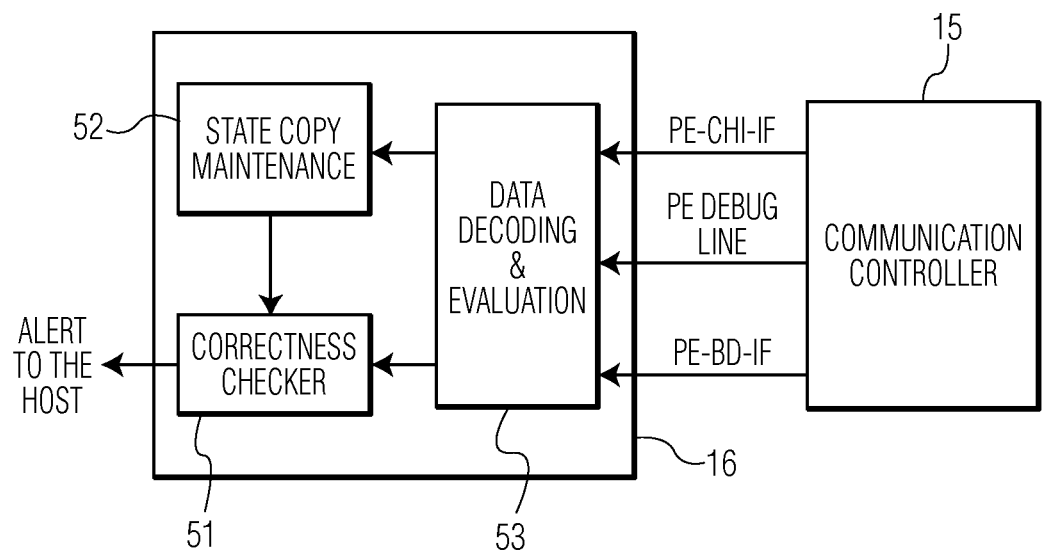
FIG. 5 illustrates a construction of a monitoring device according to the present invention.

In FIG. 5 a schematic illustration of the internal components of such a monitoring device 16 is provided. The monitoring device 16 receives preprocessed information from the communication controller 15 and in particular of the debug lines out of the protocol engine 18 in the communication controller 15. Further, it receives information or data from the bus driver interface of the communication controller 15. Finally, it receives information from the controller host interface within the communication controller 15.

These information is provided to the data decoding and evaluation unit 53, in which the data is decoded. As mentioned-above, within the FlexRay protocol, data is normally sent within frames comprising a header and a data part. Thus, for detecting the structure of the data, it may be necessary to decode the frame structure to evaluate the content of the header. Depending which information is provided from the communication controller 15 the data decoding and evaluation unit 53 is decoding the information. It also evaluates events sent from the communication controller to command the State Copy Maintenance 52 on how to change its state to continuously shadow the communication controller state.

Further, the data decoding and evaluation unit 53 evaluates the data provided by the communication controller 15 and provides the evaluation results to a correctness checking unit 51. The correctness checking unit 51 is coupled to a state copy maintenance unit 52, in which predetermined transitions between states, associated timer values and counter values are stored. Based on these stored information, the correctness checking unit 51 is able to compare the data provided by the data decoding and evaluation unit 53 and the data stored in the state copy maintenance unit 52. Based on the comparison, it is evaluated within the monitoring device 16, whether the communication controller 15 behaves correctly or not. In case of an erroneously operation of the communication controller 15 an alert signal is provided to the host 13 via the output of the correctness checking unit 51.

Figure 6:
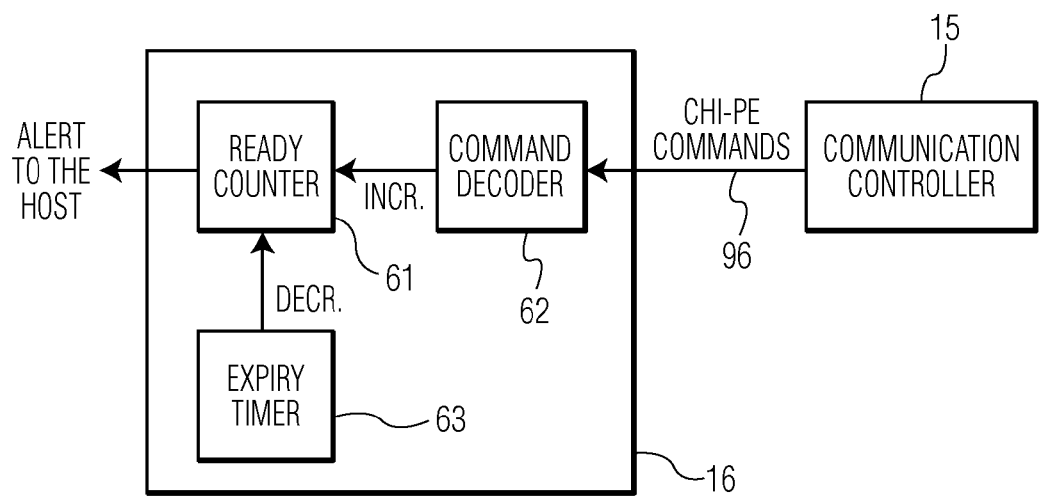
FIG. 6 illustrates an embodiment of the monitoring device according to the present invention for detecting an erroneous operating host.

FIG. 6, describes an embodiment of the monitoring device 16, which is prepared to detect erroneous behavior of the host by monitoring the host commands. These commands are provided to the command decoder 62, which is recognizing the commands transmitted by the host 13 to the communication controller 15. In case that a READY command is recognized, an increment signal is provided to the READY-counter 61. The monitoring device 16 includes an expiry timer 43, which decrements the READY-counter 61 towards zero each time a predetermined time expires, e.g. every second. In case that the READY-counter 61 exceeds a predetermined threshold, e.g. three, the host 13 is informed to take the required actions. However, especially in this case that the behavior of the host 13 is supervised by counting the READY-commands received from the host 13 per time or by measuring the time between the READY-commands, it is useful to further provide a fault signal to an additional supervising unit (not illustrated) to take the required actions to reset or shut off the host 13, which is operating erroneously.

Figure 7:
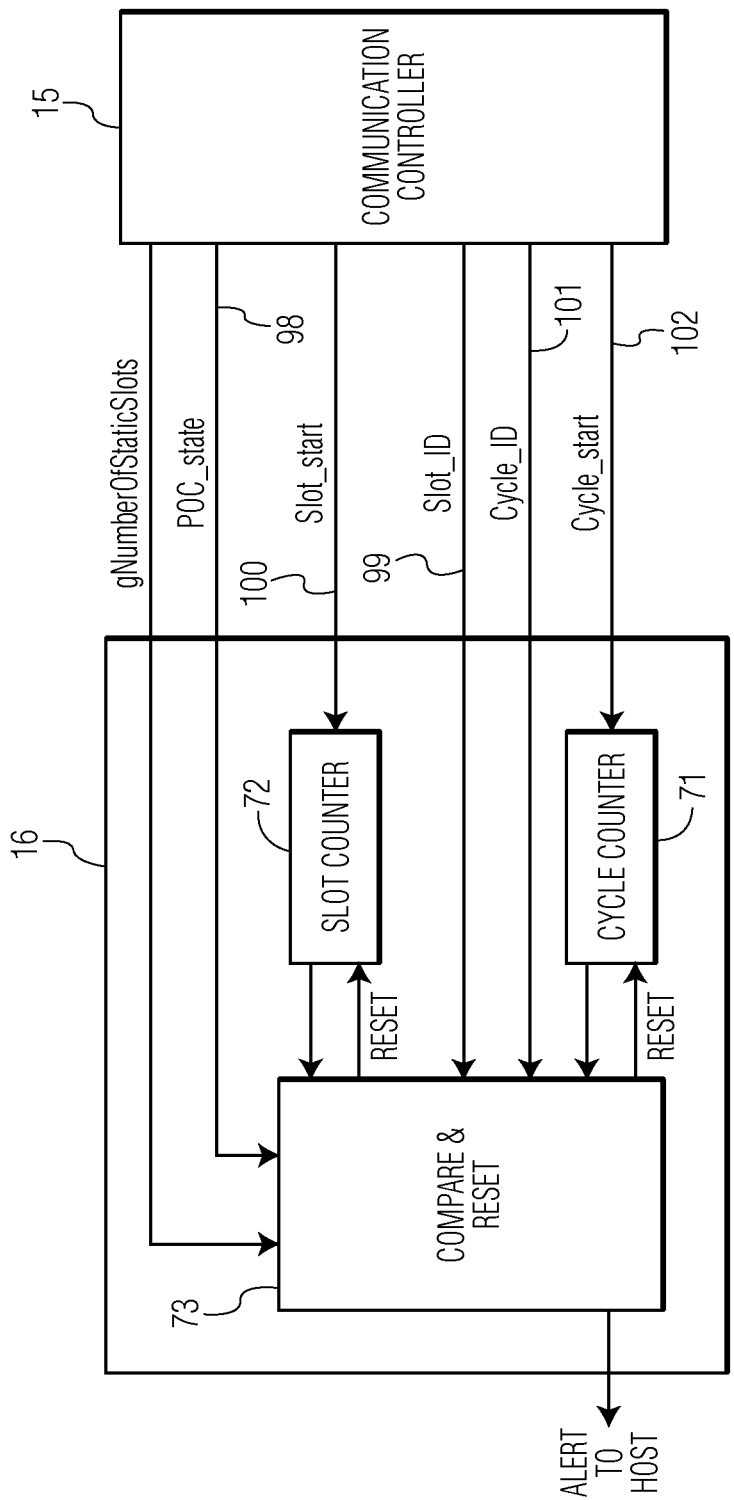
FIG. 7 illustrates an embodiment of the monitoring device according to the present invention for detecting internal states of the communication controller.

FIG. 7 illustrates a realization of the monitoring device 16, in which the communication controller 15 provides a plurality of information for detecting slot or cycle counting problems of the communication controller 15 which could lead to clique formation. All these information are provided directly from the internal terminals of the communication controller 15. The monitoring device 16 includes a slot counter 72 for counting the slots by increasing the counter when receiving a slot start signal from the communication controller 15. Further, there is a cycle-counter 71, which is increased after receiving a cycle start from the communication controller 15. Both counting values (slot, cycle) are providing to a compare and reset unit 73. The compare and reset unit 73 further receives the number of static slots, the state of the Protocol Operation Control (POC) unit of the communication controller, the slot ID and the cycle ID. Based on these signals, the compare and reset unit 73 is able to compare the slot and cycle counter values of the communication controller 15 with its own slot and cycle counter values. In case of a mismatch, for instance if the slot counter of the communication controller 15 is reset during a state allowing no resetting, an error is detected, which is signaled to the host 13.

Figure 8:
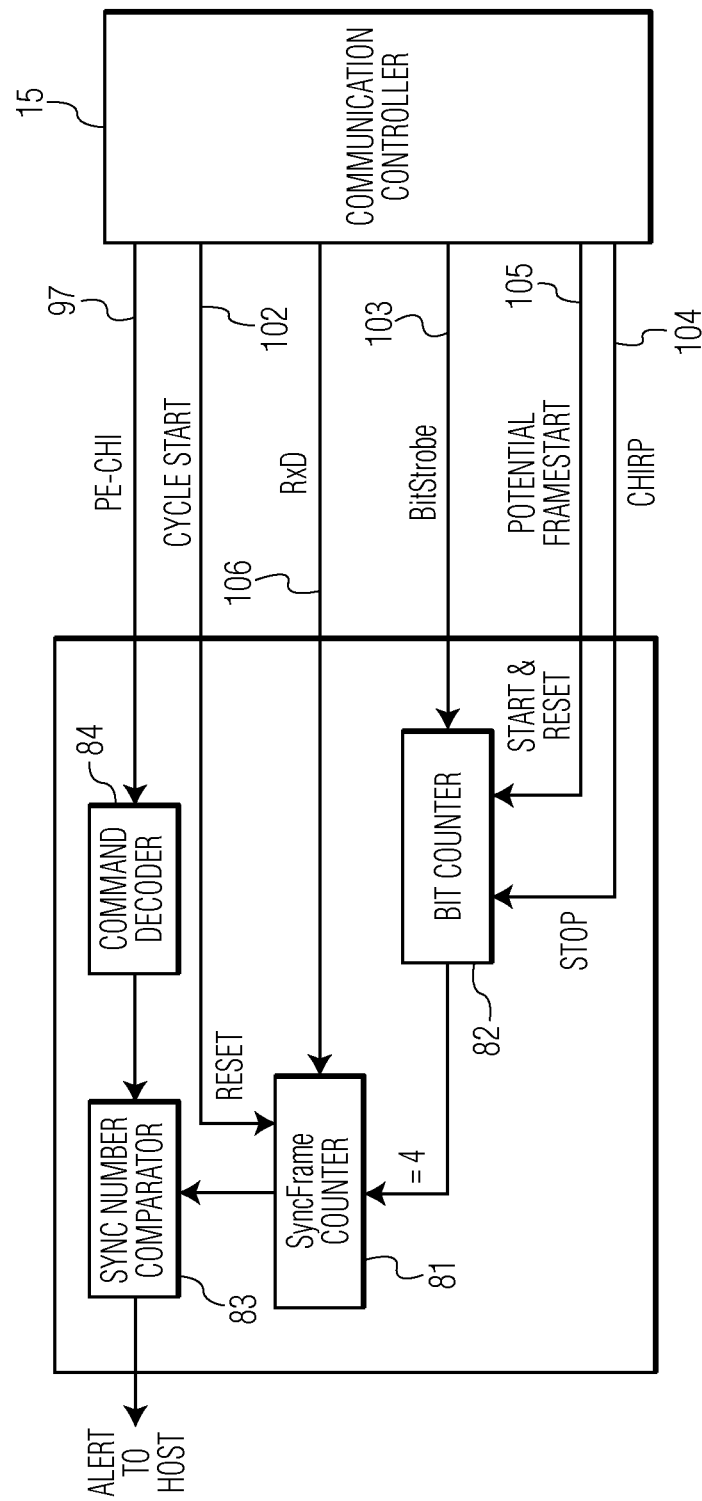
FIG. 8 illustrates an embodiment of the monitoring device according to the present invention for detecting an erroneous sync frame reporting of the communication controller.

FIG. 8 illustrates the detecting of spurious sync frame reporting. If the communication controller 15 receives a sync frame on the receiving path, it recognizes the sync frame and reports the receiving of a sync frame to the host 13. However, it may happen that a communication controller 15 does not receive a sync frame or does not correctly recognize the sync frame, but reports a correct reception of a sync frame to the host 13. In such case the communication controller 15 is operating erroneously. For detecting such mismatch between the sync frame reception and sync frame reporting, the monitoring unit 16 uses the preprocessed received data from the communication controller 15. The communication controller 15 includes a decoder unit, in which the received bits are strobed before further processing within the communication controller 15. These preprocessed received data bits are provided to the monitoring device 16, which may recognize based on these strobed bits, whether the received header belongs to a sync frame or not. The number of sync frame headers, which are received by the communication controller 15 during a cycle, is then counted in unit 81. If the communication controller 15 reports to the host 13 that it has received a plurality of sync frames, which is not the exact number of really received sync frames, the host is informed about this non-correctly behavior of the communication controller 15.

Moreover, if only non-startup nodes continues to send sync frames in a network after all startup nodes have dropped out, this leads to the problem that nodes which want to reintegrate again are not able to reintegrate since there are no Startup-frames. Also the alternative of coldstarting the network anew is blocked as there are constantly frames. To detect such a situation and allow the still integrated hosts to remedy it by completely shutting down the network the monitoring device 16 can additionally also counts the number of frames with startup bit set. This would be realized with a second counter similar to counter 81 which would be triggered by counter 82 when that counter reaches 5. If the number of frames including such startup bit is zero in a cycle, the host is informed and can, if the situation continues for several cycles, decide to initiate a network wide shutdown.

Figure 9:
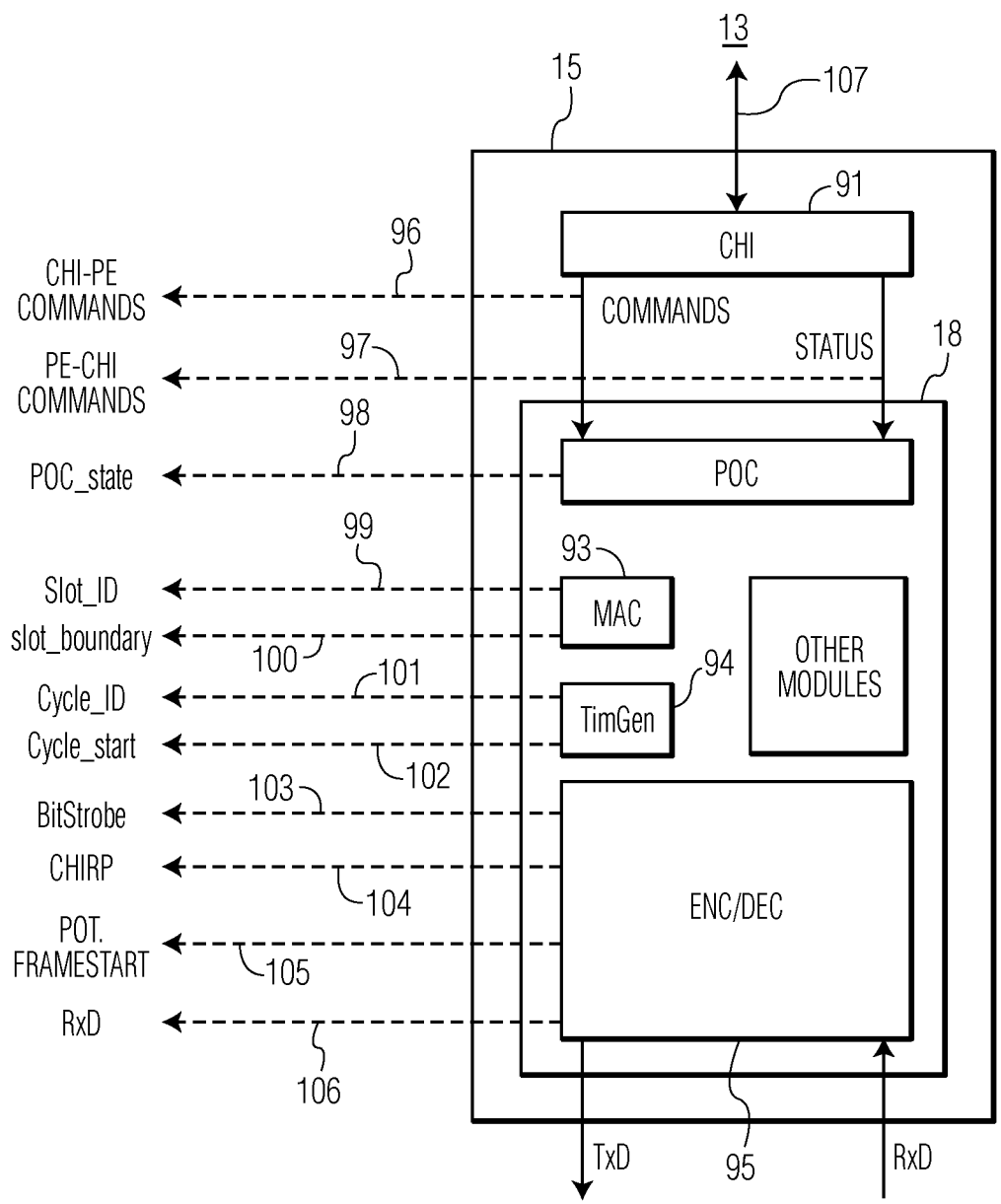
FIG. 9 shows an internal construction of a communication controller according to the present patent application.

FIG. 9 shows the internal construction of a communication controller 15 as used for the present patent application.

The communication controller 15 comprises a controller host interface 91, which is managing the data flow between the communication controller 15 and the host 13 via the connection line 107. The controller host interface 91 receives status information from the protocol engine 18. This status information comprises commands, which are transmitted from the protocol engine 18 to the controller host interface 91. Such commands are provided to the monitoring device 16 via line 97. In particular, by monitoring the information provided from the protocol engine 18 to the controller host interface 91 via the line 97 in the monitoring device 16, it is possible to provide the commands to a command decoder 84 as shown in FIG. 8 for detecting whether the communication controller 15 reports a wrong number of received sync frames to the host 13.

The controller host interface 91 provides information and commands received from the host 13 to the protocol engine 18. These commands are provided via line 96 (CHI-PE commands) to the command decoder 62 (FIG. 6) in the monitoring device, in which it is monitored whether the host 13 permanently provides READY commands to the communication controller 15 in case of an erroneously behavior of the host 13.

The protocol engine 18 includes a protocol operation control 92, a medium access control 93, a time generation 94 and an encoder/decoder 95. Further, there are other modules within the protocol engine 18 not important for the present patent application and therefore without any explanation. The protocol operation control 92 defines the sequence of states though which protocol engine 18 progresses. Thus, therein it is defined from which state the protocol engine 18 may pass to a further state. Out of this protocol operation control 92, the POC state is provided via line 98 to the monitoring device 16. In particular, this POC state is used in an embodiment explained in FIG. 7. In this embodiment, it is monitored whether the communication controller 15 generates counting problems, which may result in a clique-formation of some nodes. The state of the protocol information controller 92 is provided to the compare & reset unit 73, in which the slot values and cycle values of the communication controller 15 are compared with the internal values of the monitoring device 16, wherein the case of a mismatch the host 13 is informed.

The medium access control unit 93 decides whether to transmit or receive information to/from the bus. In case that the host 13 provides data to be transmitted to the bus, the medium access control 93 counts the slots on the bus and controls when the CHI 91 is asked to forward the information from the host 13 to the encoder/decoder 95 for transmitting the information to the bus in the respective reserved slots for the respective node 10.

The medium access control 93 provides the slot ID number via line 99 and the slot boundaries (basically equivalent to a Slot start) via line 100 to the monitoring device 16. The slot boundary and the slot ID signals are provided to the compare & reset unit 73 and to the slot counter 72 respectively for detecting any counting problems of the communication controller 15.

Further, the protocol engine 18 of the communication controller 15 includes a time generation unit 94 counting microticks to generate macroticks. The microtick is the smallest time unit within the communication controller 15, whereas the macrotick is the network wide time unit used between the nodes. The time generation unit 94 is also responsible for determining the cycle the network is in and provides the cycle ID signal via line 101 and the cycle start signal via line 102 to the monitoring device 16 and in particular to the compare & reset unit 73 and to the cycle counter 71, respectively.

Finally, the communication controller 15 includes an encoder/decoder 95, in which the data is prepared for being transmitted and is prepared after being received from the bus via TxD or the RxD path, respectively. The encoder/decoder unit 95 provides the BitStrobe signal via line 103 to the bit counter 82 each time a new bit is decoded since when receiving any data in the encoder/decoder 95, it is necessary to monitor whether the received data include a frame and in particular whether the data include a sync frame. Therefore, it needs to be monitored whether the fourth bit of the frame header is set, which indicates that the received frame is a sync frame. Therefore, the encoder/decoder 95 also provides a signal of a potential frame start via line 105 to the bit counter 82 for starting the bit counter 82 in the monitoring device 16. Further the encoder/decoder 95 provides a CHIRP signal via line 104 indicating that the network is in the idle state allowing the monitoring device 16 to stop evaluating received bits. The received data bits are strobed and provided via the RxD line 106 to the sync frame counter 81 in the monitoring device 16 as shown in FIG. 8. Based on the cycle start signal on line 102 from the time generation unit 94, the sync frame counter 81 is reset when starting a new cycle. Thus, the monitoring device 16 is able to reset the sync frame counter 81 for counting the number of sync frames received by the communication controller 15 and to compare the number of received sync frames in the sync number comparator 83. In case that the number of sync frames reported to the host 13 is greater than the number of sync frames received by the communication controller 15, the host is informed of the erroneously behavior of the communication controller 15.

Although the embodiments are explained successively it may be easily possible to combine the components of the monitoring devices 16 as shown in the FIGS. 6-8. Thus, it is possible to monitor whether the communication controller 15 is sending continuously symbols like CAS/WUS and additionally to check whether the host 13 is sending continuously READY commands. The more special faults should be detected by monitoring device the more complex the monitoring device needs to be realized. However, some counters in the monitoring device may be used for different fault detections, thus a double function of parts of the monitoring device 16 maybe possible.

The invention claimed is:

1. A node of a distributed communication system, the communication system includes a plurality of nodes, each node coupled to a communication medium and comprising:
a communication controller coupled to a receiving and a transmission path,
a host for performing an application, wherein the transmission path connects the host to the communication controller, and
a monitoring device coupled the transmission path of the communication controller, wherein the monitoring device is configured to detect synchronization errors by monitoring at least one of host commands from host, slot, and cycle signals from internal lines of the communication controller, and received data bits from the receiving path of the communication controller, inform the host if the monitoring device detects a synchronization error, and the host is configured to perform at least one predetermined action upon being informed of a detected synchronization error.

2. The node as claimed in claim 1, wherein the communication system is operating based on a time based protocol, wherein each node is allowed to transmit data according to a predetermined time schedule.

3. A node of a distributed communication system, the communication system includes a plurality of nodes, each node coupled to a communication medium and comprising:

a communication controller coupled to a receiving and a transmission path, a host for performing an application, and a monitoring device coupled at least to one of the receiving path of the communication controller, the transmission path of the communication controller, an interface between the communication controller and the host, and internal lines of the communication controller, wherein the monitoring device is configured to detect synchronization errors by monitoring at least one of host commands from the host, slot and cycle signals from the internal lines of the communication controller, and received data bits from the receiving path of the communication controller, wherein the monitoring device is configured to inform the host if the monitoring device detects a synchronization error, and wherein the host is configured to perform at least one predetermined action upon being informed of a synchronization error, the slot and cycle signals are compared with stored information in the monitoring device, and, in case of a mismatch between the slot and cycle signals and the stored information in the monitoring device, the host is informed.

4. The node as claimed in claim 1, wherein the at least one predetermined action includes at least one of resetting the communication controller and disabling the transmission path of the communication controller.

5. The node as claimed in claim 1, further comprising:

an external supervising device configured to control at least one of the communication controller and the host if the monitoring device detects a synchronization error.

6. The node as claimed in claim 1, wherein the monitoring device includes at least one of a counter, a timer, a memory, and a comparator.

7. The node as claimed in claim 1, wherein the monitoring device is formed on the same chip as the communication controller.

8. A distributed communication system operating on a time triggered protocol, comprising at least one node as claimed in claim 1.

9. A node of a distributed communication system, the communication system includes a plurality of nodes, each node coupled to a communication medium and comprising:

a communication controller coupled to a receiving and a transmission path, a host for performing an application, and a monitoring device coupled at least to one of the receiving path of the communication controller, the transmission path of the communication controller, an interface between the communication controller and the host, and internal lines of the communication controller, wherein the monitoring device is configured to detect synchronization errors by monitoring at least one of host commands from the host, slot and cycle signals from the internal lines of the communication controller, and received data bits from the receiving path of the communication controller, wherein the monitoring device is configured to inform the host if the monitoring device detects a synchronization error, and wherein the host is configured to perform at least one predetermined action upon being informed of a synchronization error, and the monitoring device is configured to detect synchronization errors by monitoring the host commands from the host, the slot and cycle signals from the internal lines of the communication controller, and the received data bits from the receiving path of the communication controller.

* * * * *